May 9, 1961 D. J. VOSS 2,983,303
METHOD AND APPARATUS FOR MAKING PREFORMS FROM FIBERS
Filed Jan. 27, 1958
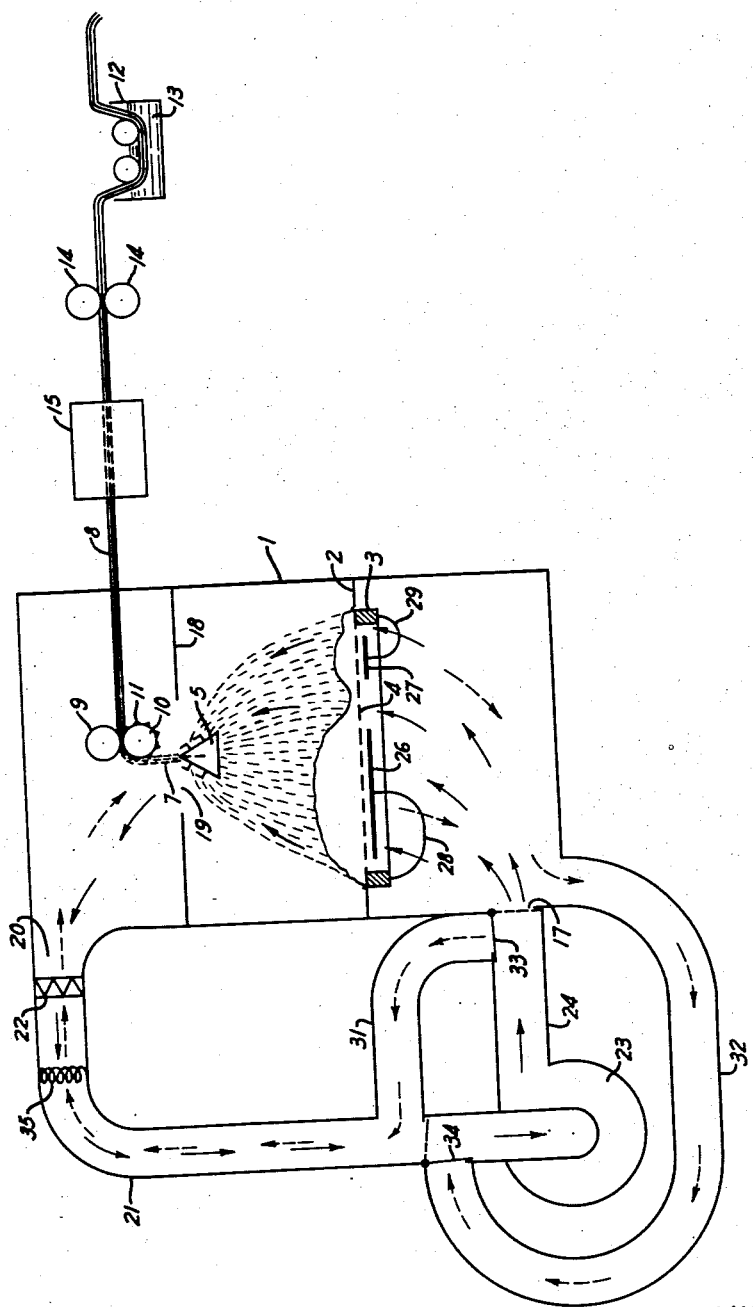
INVENTOR.
DONALD J. VOSS
BY
Brown, Critchlow, Flick & Peckham
His Attorneys

United States Patent Office 2,983,303
Patented May 9, 1961

2,983,303

METHOD AND APPARATUS FOR MAKING PREFORMS FROM FIBERS

Donald J. Voss, Pittsburgh, Pa., assignor to Mine Safety Appliances Company, a corporation of Pennsylvania Filed Jan. 27, 1958, Ser. No. 711,453

6 Claims. (Cl. 154—1)

This invention relates to the manufacture of preforms for subsequent molding, and more particularly relates to preforms made from fibers matted together.

The usual preform of this character is made by blowing or drawing short air-borne fibers against a screen of the desired shape. After a layer of fibers of the required thickness has been built up on the screen to produce a preform, the latter is removed from the screen and placed in a mold with a suitable resin. The preform then is molded into final shape under heat and pressure. The use of resin in the mold could be eliminated if it could be applied to the fibers before they are distributed over the preform screen, but resin coated fibers would be so heavy that they would not distribute themselves properly over the screen especially where it is desired to make complex shapes.

It is among the objects of this invention to provide for the making of preforms, in which the fibers are coated with resin before being applied to a preform screen, in which any desired distribution of fibers over the screen can be produced, in which only heat and pressure are required for the subsequent molding of the preform, and in which production costs are reduced.

In accordance with this invention, resin-coated fibers are poured onto a preform screen while air is blown up through it to retard and control the descent of the fibers so that they will distribute themselves properly over the screen. After a fiber layer of the desired thickness has been built up on the screen, the direction of air flow is reversed and the air is heated to cause the fiber coatings to become tacky and thereby stick the fibers together on the screen. This produces a preform. The air is then shut off in order to allow the coatings to harden again so that the preform will remain intact when it is removed from the screen for molding under heat and pressure. No resin need be added in the mold.

The invention is illustrated diagrammatically in the accompanying drawing, which includes a vertical section through a chamber in which a preform is being produced.

Referring to the drawing, an upright housing 1 is provided in its lower portion with an interior horizontal circular flange 2. Disposed in the area encircled by the flange and substantially engaging the inner edge of the flange is a horizontal ring 3 that may be rotated on a vertical axis in any suitable manner. The ring supports a preform screen 4, which is shown flat but which may have any desired contour in accordance with the shape of preform that is to be made. Located some distance above the center of the screen is a fiber distributor 5 of any desired construction. The one shown is conical and provided with outwardly projecting lugs. The distributor is rotatable on a vertical axis in any suitable manner.

A short distance above the apex of the distributor there is means for pouring a stream 7 of fibers onto the rotating distributor. This means may take various forms, but preferably is a cutter for chopping off the front ends of a plurality of threads 8 that are fed forward to it continuously. For example, the cutter may be formed from two feed rollers 9 and 10, one of which is provided with knives 11 that cut the threads into short fibers. The threads come from a point outside of the housing and are led from a suitable source of supply through a tank 12, in which they are coated with a suitable resin 13. From there the threads pass between feed rollers 14 and, depending on the nature of the resin, they may then pass through a short oven 15 before entering the housing. The distributor 5 attempts to throw the fibers out laterally in all directions, but, due to the resin coating on the fibers, they are relatively heavy and will tend to fall straight down from the distributor. That would prevent their being distributed properly over the preform screen or in greater density over some areas of the screen than others.

It is therefore a feature of this invention that the descent of the fibers is retarded and controlled by a counter current flow of air which compensates for their added weight. Accordingly, a stream of air is blown into the housing through an opening 17 near its bottom, and this air flows up through the screen with sufficient velocity to partially support the fibers and thereby greatly retard the speed at which they fall onto the screen. By, in effect, reducing the weight of the fibers, they float down slowly and spread out and distribute themselves in the desired manner over the screen. To control the air stream and keep it from blowing the fibers out over flange 2, its passage through the housing is guided and restricted directly above the distributor by a partition plate 18 that extends across the housing. The center of the plate has a relatively small opening 19, through which the air must flow. It then flows out an opening 20 near the top of the housing and into an air duct 21. The entrance of the duct preferably is provided with a filter 22 to prevent fibers from being carried by the air stream over into the duct. The lower end of the duct is connected to the inlet of a centrifugal blower 23, the outlet of which is connected by a short duct 24 to the bottom inlet 17 of the housing.

To make complex shapes, the distribution of the fibers over the preform screen is controlled by directing the up-flowing air principally through selected portions of the screen. This can be done by one or more baffles beneath the screen. These baffles 26 and 27 may be supported by brackets 28 and 29 from the screen-supporting ring 3. The baffles are spaced from the screen so that air will flow up through its entire area, although it will have a greater velocity in the unbaffled areas. The fibers will fall in the greatest abundance in the areas over the baffles, where the air velocity is least.

After the fibers have been deposited to the desired depth on the screen, the direction of air flow through the screen is reversed. This can be done by providing a bypass duct 31 connecting the short duct 24 with the duct 21, and by also providing an outlet duct 32 extending from the bottom of the housing around to duct 21 at a point between the bypass duct and the blower. The bypass duct and outlet duct 32 normally are closed by dampers 33 and 34, respectively, but when it is desired to reverse the direction of air flow, these dampers are opened and are swung across housing inlet 17 and across duct 21 between the points where the bypass duct and outlet duct connect with it. Consequently, air from the blower is deflected through the bypass duct and duct 21 into the top of the housing. The air flows down through the housing and screen and out through outlet duct 32 to the blower inlet. This air presses the fibers down onto the screen. Also, an electric heater 35 in duct 21 heats the incoming air so that it will soften the coatings on the fibers enough to make them tacky and cause them to stick to one another. After the resin coatings throughout the preform have been made tacky in this manner, the air is shut off by stopping the blower. The preform is allowed to set a short time until the fiber coatings harden and thereby make the preform relatively rigid. It can then be lifted off the screen and placed in a heated mold, where it will be molded into final shape under pressure. Due to the fact that resin (the coatings on the fibers) is incorporated into the preform as it is made, there is no need for additional resin during the subsequent molding. This eliminates handling of resin by the molder and also reduces production costs.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The method of making a preform for subsequent molding, comprising pouring resin-coated fibers down onto a preform screen while blowing air up through it to retard and control descent of the fibers, reversing the direction of air flow and heating the air, directing the heated air down through the screen to cause the fiber coatings to become tacky and stick the fibers together on the screen to make a preform, and then shutting off the air to allow the coatings to harden again in order to hold the preform intact so that it can be removed from the screen.

2. In the method recited in claim 1, directing the air up through the screen in predetermined paths to selectively vary the thickness of the preform.

3. The method of making a preform for subsequent molding, comprising feeding threads forward continuously from a source of supply, coating the traveling threads with thermoplastic resin, cutting off the front ends of the threads to form short fibers, pouring the coated fibers onto a preform screen while blowing air up through it to retard and control descent of the fibers, reversing the direction of air flow and heating the air, directing the heated air down through the screen to cause the fiber coatings to become tacky and stick the fibers together on the screen to make a preform, and then shutting off the air to allow the coatings to harden again in order to hold the preform intact so that it can be removed from the screen.

4. Apparatus for making a preform for subsequent molding, comprising a horizontally disposed preform screen, means for pouring resin-coated fibers down onto the screen, means for blowing air up through the screen to retard and control descent of the fibers, means for reversing the direction of air flow, and means for heating the reversed air so that when it contacts the fiber coatings it will cause them to become tacky and stick the fibers together on the screen to make a preform, whereby when the air is shut off said coatings will harden again to hold the preform intact so that it can be removed from the screen.

5. Apparatus according to claim 4, including a baffle below the screen for reducing upward air flow through a portion of the screen.

6. Apparatus according to claim 4, including means for feeding the threads forward continuously to a point above the screen, means for coating the threads with thermoplastic resin, and means at said point for cutting off the front ends of the threads to form short fibers.

References Cited in the file of this patent

UNITED STATES PATENTS

| 1,882,599 | Hodshon | Oct. 11, 1932 |
| 1,959,951 | Gerard et al. | May 22, 1934 |
| 2,501,979 | Wood et al. | Mar. 28, 1950 |
| 2,571,334 | Browne | Oct. 16, 1951 |
| 2,587,814 | Borkland | Mar. 4, 1952 |
| 2,653,355 | Essman | Sept. 29, 1953 |
| 2,702,069 | Lannan | Feb. 15, 1955 |
| 2,725,601 | Brenner | Dec. 6, 1955 |
| 2,811,195 | Kloss | Oct. 29, 1957 |